US012786137B2

(12) United States Patent
Kucera et al.

(10) Patent No.: US 12,786,137 B2
(45) Date of Patent: Nov. 3, 2026

(54) SYSTEMS AND METHODS FOR EVENT PROCESSING

(71) Applicant: ADOBE INC., San Jose, CA (US)

(72) Inventors: John Thomas Kucera, San Jose, CA (US); Sandeep Nawathe, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 370 days.

(21) Appl. No.: 17/931,778

(22) Filed: Sep. 13, 2022

(65) Prior Publication Data

US 2024/0089216 A1 Mar. 14, 2024

(51) Int. Cl.
*H04L 47/762* (2022.01)
*H04L 47/70* (2022.01)

(52) U.S. Cl.
CPC .......... *H04L 47/762* (2013.01); *H04L 47/827* (2013.01); *H04L 47/828* (2013.01)

(58) Field of Classification Search
CPC ............. H04L 63/0263; H04L 63/0227; H04L 47/781; H04L 47/828; H04L 41/0894; H04L 47/70; H04L 47/00; H04L 41/08; H04L 41/06; H04L 67/535; H04L 67/306; H04L 47/762; H04L 47/827; H04L 67/50; H04L 67/30; H04L 67/303; G06F 16/903; G06F 16/90335; G06F 16/90; G06F 16/9035; G06F 16/9535; G06N 5/025; G06N 5/04; G06N 20/00; H04N 21/4532; H04N 21/458; H04N 21/44204; G06V 10/82
See application file for complete search history.

(56) References Cited

U.S. PATENT DOCUMENTS

| | | | | |
|---|---|---|---|---|
| 10,242,019 | B1 * | 3/2019 | Shan | G06N 7/01 |
| 12,080,425 | B1 * | 9/2024 | Corts | G16H 50/20 |
| 2011/0184813 | A1 * | 7/2011 | Barnes | G06F 16/9535 705/14.66 |
| 2021/0142256 | A1 * | 5/2021 | M Y | G06Q 30/0631 |
| 2021/0158398 | A1 * | 5/2021 | Merrill | G06Q 30/0277 |
| 2022/0245115 | A1 * | 8/2022 | Kulkarni | G06F 16/2428 |

* cited by examiner

*Primary Examiner* — Rachel J Hackenberg
(74) *Attorney, Agent, or Firm* — F. CHAU & ASSOCIATES, LLC

(57) ABSTRACT

Systems and methods for event processing are provided. One aspect of the systems and methods includes receiving an event corresponding to an interaction of a user with a digital content channel; identifying a rule state for a segmentation rule that assigns users to a segment; assigning the user to the segment by evaluating the segmentation rule based on the rule state and the event from the digital content channel; updating the rule state; and providing customized content to the user based on the assignment of the user to the segment.

20 Claims, 7 Drawing Sheets

SYSTEMS AND METHODS FOR EVENT PROCESSING

BACKGROUND

The following relates to event processing. Event processing includes techniques for receiving data relating to an occurrence and manipulating or classifying other data in response to the data relating to the occurrence. An example application of an event processing technique is using the data related to the occurrence to determine a segment membership of a user based on data relating to the user.

However, current techniques for determining a user segment membership from a sequence of events based on rules includes storing all events associated with each user profile, and retrieving and processing these events for each profile when audience segmentation is to be determined, which can be prohibitively costly and time-consuming. Furthermore, current techniques for determining a user segment membership based on events cannot update segment membership in real time. There is therefore a need in the art for efficient event processing techniques.

SUMMARY

Embodiments of the present disclosure provide a succinct rule state created during an evaluation of rules for received events for a user profile, rather than storing all events relating to the user profile. This in turn allows embodiments of the present disclosure to assign a user corresponding to the user profile to a segment of users based on the segment in real time, while retaining a minimum amount of data in storage. For example, embodiments of the present disclosure receive an event for a user profile, retrieve a rule state and a segmentation rule corresponding to the user profile, and evaluate the segmentation rule based on the event and the rule state. Embodiments of the present disclosure then segment the user and update the rule state based on a result of the evaluation, and provide customized content to the user based on the segmentation.

A method, apparatus, non-transitory computer readable medium, and system for event processing are described. One or more aspects of the method, apparatus, non-transitory computer readable medium, and system include receiving an event corresponding to an interaction of a user with a digital content channel; identifying a rule state for a segmentation rule that assigns users to a segment; assigning the user to the segment by evaluating the segmentation rule based on the rule state and the event from the digital content channel; updating the rule state; and providing customized content to the user based on the assignment of the user to the segment.

A method, apparatus, non-transitory computer readable medium, and system for event processing are described. One or more aspects of the method, apparatus, non-transitory computer readable medium, and system include storing, by a database component, an event corresponding to a record in a database; identifying, by the state manager, a rule state for a query rule for retrieving records in the database; receiving, by a query engine, a query corresponding to the query rule; retrieving, by the query engine, the record from the database by evaluating the query rule based on the rule state in response to the query; updating, by the state manager, the rule state; and providing, by a content component, customized content based on the retrieved record.

An apparatus and system for event processing are described. One or more aspects of the apparatus and system include a processor; a memory storing instructions executable by the processor; a state manager configured to identify a rule state for a segmentation rule that assigns users to a segment based on events from a digital content channel and to update the rule state; an evaluation engine configured to assign the user to the segment by evaluating the segmentation rule based on the rule state and the event from the digital content channel; and a content component configured to provide customized content to the user based on the assignment of the user to the segment.

DETAILED DESCRIPTION

Figure 1:
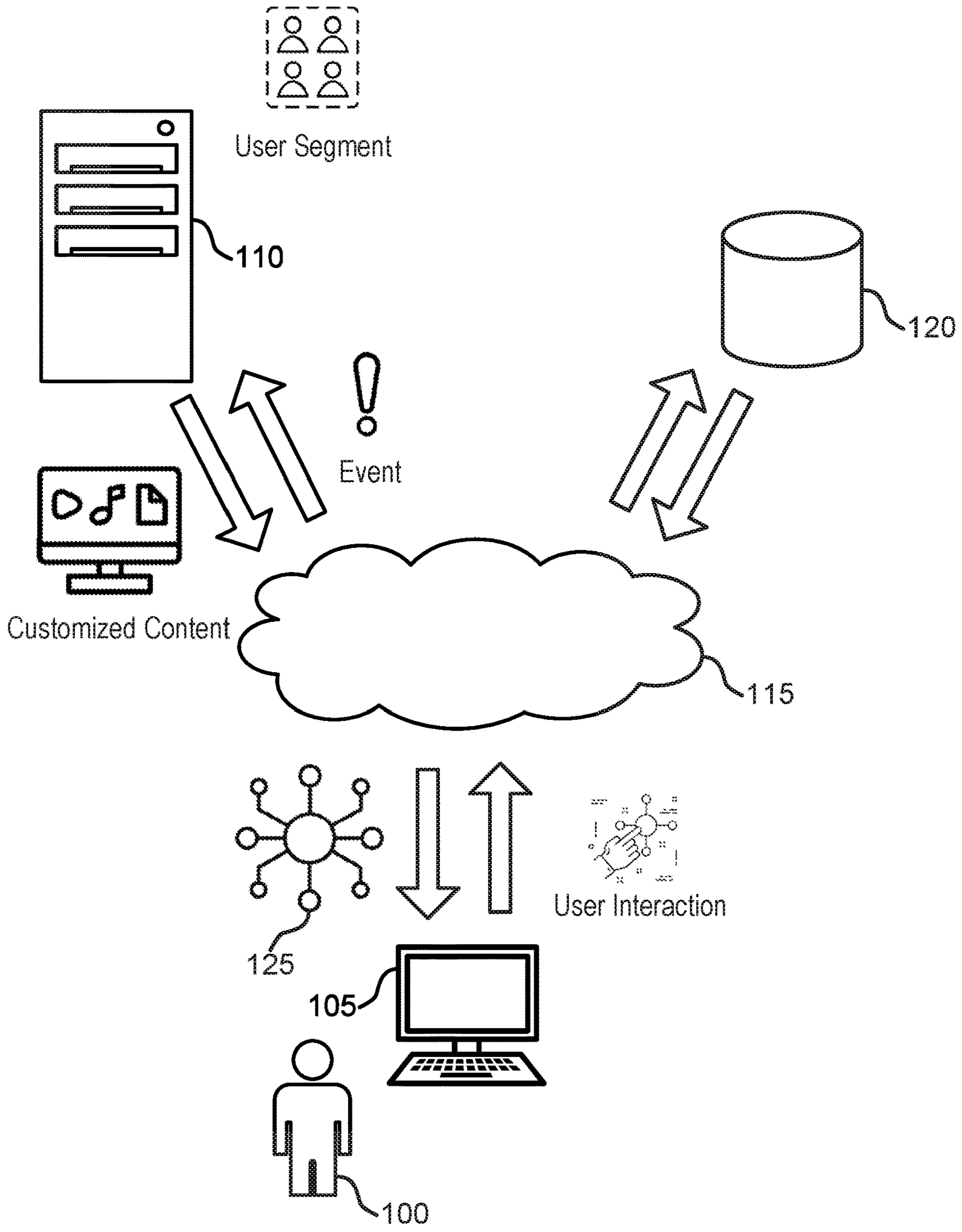
FIG. 1 shows an example of an event processing system according to aspects of the present disclosure.

The present disclosure relates to event processing. Event processing includes techniques for receiving data relating to an occurrence and manipulating or classifying other data in response to the data relating to the occurrence. An example application of an event processing technique is using the data related to the occurrence to determine a segment membership of a user based on data relating to the user.

However, current techniques for determining a user segment membership from a sequence of events based on rules includes storing all events associated with each user profile, and retrieving and processing these events for each profile when audience segmentation is to be determined. In some cases, a third-party user can maintain rules for many user profiles (in some cases, for example, billions of profiles), and as each event can include kilobytes of data, it can be very costly to store the events associated with the user profiles and very time-consuming to retrieve and process the user profiles and the events associated with the user profiles.

In addition, current techniques for determining a user segment membership cannot update segment membership in real time. For example, it is desirable to update segment membership of a user immediately after an interaction of the user with a digital content channel in order to, for example, determine what should be displayed to the user via the digital content channel based on the interaction. In this case, if a user's segment membership is not updated within milliseconds of the interaction, the user may perceive a lack of responsiveness in the digital content channel, and this perception may negatively impact a user's propensity to take a desired action.

An example of a current technique for user segmentation is batch processing user profiles at a predetermined time interval (for example, every 24 hours). This approach is inefficient as it includes re-processing all events corresponding to all user profiles regardless of whether there were any changes to the user profiles in the intervening interval of time. As such, batch segmentation is slow and costly given the amount of data that is retrieved and processed during each time interval, and is not suitable for real-time user segmentation, as results provided by batch segmentation may be out of date by the time the batch segmentation is performed.

Another example of a current technique for user segmentation is streaming segmentation. Streaming segmentation involves updating each user profile shortly after an event or other profile attribute change by comparing the event against all previous events for the user profile. When a new event arrives, the new event is added to a set of events for a corresponding user profile, and a segment membership of the user profile is updated by reprocessing all of the events corresponding to the user profile. Streaming segmentation techniques typically use a few seconds to a few minutes to process each update, which is insufficient to handle real-time use cases that require a millisecond-level response. Furthermore, storing an entire event sequence for each user profile is prohibitively expensive due to the amount of data that needs to be stored with each profile.

Accordingly, aspects of the present disclosure provide a system for event processing. According to some aspects, the system includes a state manager, an evaluation engine, a segmentation engine, and a content component.

According to some aspects, the state manager is configured to receive an event corresponding to an interaction of a user with a digital content channel and to identify a rule state for a segmentation rule that assigns users to a segment.

According to some aspects, the evaluation engine is configured to assign the user to the segment by evaluating the segmentation rule based on the rule state and the event from the digital content channel. According to some aspects, the state manager is further configured to update the rule state. According to some aspects, the content component is configured to provide customized content to the user based on the assignment of the user to the segment.

By evaluating a segmentation rule based on an incoming event and a rule state, the evaluation engine minimizes data that is used for assigning a user to a segment to only data that relates to the incoming event, the segmentation rule, and the rule state, rather than all previous events for the user. Accordingly, the evaluation engine can quickly (e.g., in real time) evaluate the segmentation rule to assign the user to a user segment and provide customized content to the user based on the assignment of the user to the segment.

As used herein, a “digital content channel” is a channel through which digital content (such as media including text, audio, images, video, or a combination thereof) is provided. Examples of a digital content channel include a website, a software application, an Internet-based application, an email service, a messaging service (such as SMS, instant messaging, etc.), a television service, a telephone service, etc. As used herein, a “content channel” includes a digital content channel, as well as physical locations (such as stores) through which content (including digital content, as well as physically embodied media, products, and the like) is provided.

As used herein, an “interaction with a digital content channel” refers to a transmission of data to or a reception of data from a digital content channel by a user via a user device. Therefore, examples of interactions with a digital content channel include viewing a website (such as a home page, a product page, an add-to-cart page, a purchase page, etc.) via a web browser included on a user device, providing an input to a software application via a user interface of a user device, opening an email via an Internet-based application using a user device, opening an SMS message via a user device, selecting a television channel provided by a television service via a user device, receiving a phone call via a user device, etc. As used herein, a user is an operator of a user device. For example, a user may provide inputs via a user interface of a user device to operate the user device.

As used herein, “an interaction with a content channel” includes an interaction with a digital content channel, as well as an interaction between a user and a physical location. For example, a user device may enter a geofenced area indicating a physical location, provide information that the user has “checked in” at the physical location, provide information that a user intends to purchase or receive delivery of a physical object at a physical location, etc.

As used herein, an “event” is a set of data that is generated by a content channel or a device associated with the content channel in response to an interaction of a user with the content channel. In some cases, an event includes data that identifies: the content channel; the user; a user device; the interaction (including a predetermined “type” of the interaction, such as a home page view, an add-to-cart interaction, a purchase, a presence of a user device within a geofenced area, etc.); a time stamp indicating a date and/or time at which the interaction occurred; a third-party user identifier corresponding to a third-party user that is associated with the digital content channel; or a combination thereof.

As used herein, according to some aspects, a “user profile” includes data associated with the user. According to some aspects, a user profile includes dynamic event data that represents an interaction of the user with a digital content channel and/or characteristic data that does not depend on the dynamic event data. For example, in some cases, characteristic data is data that is static relative to dynamic event data in that it might not change based on an interaction with a digital content channel and may change less frequently than dynamic event data. As an example, a user profile may include dynamic event data that represents a time stamp and an indication of a visit to a home page website by the user via a user device, and characteristic data that includes, for example, an identifier of a user associated with the user device, a location of the user device, the type of user device, characteristics of the user device, etc. In this case, the location of the user device is characteristic data because it does not change based on the visit to the home page website (although data indicating the location may be gathered as a result of the visit to the website).

As used herein, a “segmentation rule” refers to a rule for assigning a user to a segment of users based on a user profile. As an example, a segmentation rule for a user profile may be constructed such that if certain data is included in a rule state and certain data is included in the event, a user corresponding to the user profile is assigned to a segment corresponding to the data in the rule state and the data in the event. Similarly, according to some aspects, a “query rule” refers to a rule for retrieving a record from a database when data in the record satisfies the query rule. In some cases, a record includes data similar to data that is included in a user profile. In some cases, a segmentation rule or a query rule is provided to the system by a third-party user, and the segmentation rule or the query rule includes a third-party user identifier that identifies the a third-party user.

As used herein, a “a third-party user” is an entity that uses the event processing system to identify segments of users or to retrieve records so that customized content can be distributed based on the segments or the records, respectively. In some cases, a third-party user provides the segmentation rule or the query rule to the system so that a user can be assigned to a segment corresponding to the segmentation rule or that a record can be retrieved based on the query rule, respectively. In some cases, the third-party user is a content provider.

As used herein, a "node rule" refers to a rule corresponding to an event that can be used to evaluate a segmentation rule or a query rule. For example, in some cases, a segmentation rule or a query rule can relate to a set of events, and each of the set of events can correspond to a node rule that can be evaluated to in order to evaluate the segmentation rule or the query rule. As an example, a group of node rules may be constructed such that if data is included in a rule state and in an event indicating that "a user device of a user in a given location has viewed a given website on a given date and the user has purchased a given product associated with the website within three days of the given date", the group of node rules and the segmentation rule is satisfied for the user profile, and the user corresponding to the user profile is assigned to a segment corresponding to the group of node rules or to the segmentation rule. In some cases, the group of node rules is a chain rule, in where the chain rule is satisfied based on logical dependencies among node rules included in the chain rule.

In this case, each of the separate events relating to a separate interaction with a digital content channel (e.g., "a user device of a user views a given website on a given date" and "the user purchases a product associated with the website within three days of the given date") can correspond to a node rule, and the segmentation rule can be evaluated based on an evaluation of each of the node rules. Related node rules can be grouped into a group of node rules.

As used herein, a "rule state" refers to a stored internal state of an evaluation engine or a query engine. In some cases, the internal state of the evaluation engine or the query engine state includes a minimum amount of data relating to previous events for a user profile that allow the evaluation engine or the query engine to respectively determine if a segmentation rule, a query rule, a node rule, or a group of node rules is respectively satisfied for the user profile or the record when a new event for the user profile or the record is received.

In some cases, after the evaluation engine or the query engine respectively determines if the segmentation rule, the query rule, the node rule, or the group of node rules is satisfied, the evaluation engine or the query engine respectively updates its internal state to include data indicating whether the segmentation rule, the query rule, the node rule, or the group of node rules is respectively satisfied and to include a minimum amount of data that would be used to determine if a future segmentation rule, query rule, node rule, or group of node rules is respectively satisfied, and the state manager stores the updated internal state of the segmentation engine or the query engine as the rule state. In some embodiments, the rule state includes a state relating to a plurality of rules and a plurality of users for at least one of the rules.

For example, in some cases, a rule state includes data relating to each event and each segmentation rule, query rule, node rule, or group of node rules that is satisfied for the given user profile or record. In some cases, a rule state includes data relating to each event and each segmentation rule, query rule, node rule, or group of node rules that is satisfied for a set of user profiles or records. In some cases, the rule state includes data relating to each segmentation rule, query rule, node rule, or group of node rules that corresponds to a third-party user identifier.

According to some aspects, a rule state is incrementally updated according to meeting a node rule of a group of node rules. For example, a first group of node rules may be true for "a user who has visited the home page of a third-party user's web site", and a second group of node rules may be true for "a user who has viewed a product on the web site, and subsequently added the product to a cart". When the user visits the third-party user's website, the internal state of the evaluation engine or the query engine (and therefore the rule state) is updated to include information indicating that the first group of node rules is satisfied for the user. If the user later adds the product to a cart, the internal state of the evaluation engine or the query engine (and therefore the rule state) is updated to include information indicating that both the first group of node rules and the second group of node rules is satisfied for the user.

Accordingly, by updating the rule state in response to an evaluation of a segmentation rule or a query rule for an event, the state manager maintains a minimum amount of data that can be provided to the segmentation engine or the query engine when the segmentation engine or the query engine evaluate a future event, thereby avoiding storing every historical event associated with a given user profile or record in order to evaluate the future event, and allowing user segmentation, record retrieval, and customized content distribution to occur in real time. Furthermore, by updating the rule state, the system stores an incremental progress of fulfilling groups of node rules that correspond to multiple events.

As used herein, "customized content" refers to content (such as media that can be provided via a digital content channel, or a physical product that can be directed to be distributed to a physical location) that is targeted based on a segment. As an example, an item of content can be a video. In this example, a third-party user may determine that a given video should be provided to users who are assigned to a given segment of users. In this case, the given video is customized content as it is targeted based on the given segment of users. As another example, an item of content is a physical object, and the physical object is customized by identifying a physical object that is intended to be provided to users who are grouped within a given segment.

An embodiment of the present disclosure is used in a customized content distribution context. For example, an event processing system according to the present disclosure receives an event relating to an interaction of a user with a digital content channel. The event processing system evaluates a segmentation rule corresponding to the event by comparing the event and a current rule state. In some cases, the segmentation rule is a predetermined rule that is provided to the event processing system by a third-party user. The event processing system then segments the user according to a determination that the segmentation rule or a portion of the segmentation rule is satisfied, and provides customized content to the user based on the assignment of the user to the segment.

For example, in some cases, the third-party user identifies content that is desirable to provide to users who are segmented in a given segment, and uses the event processing system to distribute the content to the user in response to the user being assigned to the segment. Accordingly, by segmenting the user based on the updated rule state rather than using a naïve approach of storing all events associated with each user profile and then retrieving and processing the events for the user profiles when the audience segmentation is to be determined, the event processing system minimizes the amount of data that is stored for segmenting the user, as well as enabling the user to be segmented and customized content to be distributed to the user in real time in response to receiving the event.

An embodiment of the present disclosure is used in a record retrieval context. For example, an event processing system according to the present disclosure stores an event corresponding to a record in a database. In some cases, the event corresponds to an interaction of a user with a content channel, and the record corresponds to the user. The event processing system identifies a rule state for a query rule for retrieving records in the database. For example, the query rule may be a predetermined rule that is provided to the event processing system by a third-party user. The event processing system evaluates the query rule based on the rule state and the event and updates the rule state in response to the evaluation. The event processing system identifies a record that satisfies the query rule (for example, by including data corresponding to data included in the updated rule state), and retrieves and returns the record in response to a query that corresponds to the query rule.

Accordingly, by retrieving the record based on a rule state rather than using a naïve approach of storing all events associated with the record and then retrieving and processing the events for the records, the event processing system minimizes the amount of data that is stored for retrieving the record, as well as enabling the record to be identified and retrieved in real time in response to receiving the query. For example, this allows the event processing system to provide customized content based on the retrieved record.

Figure 3:
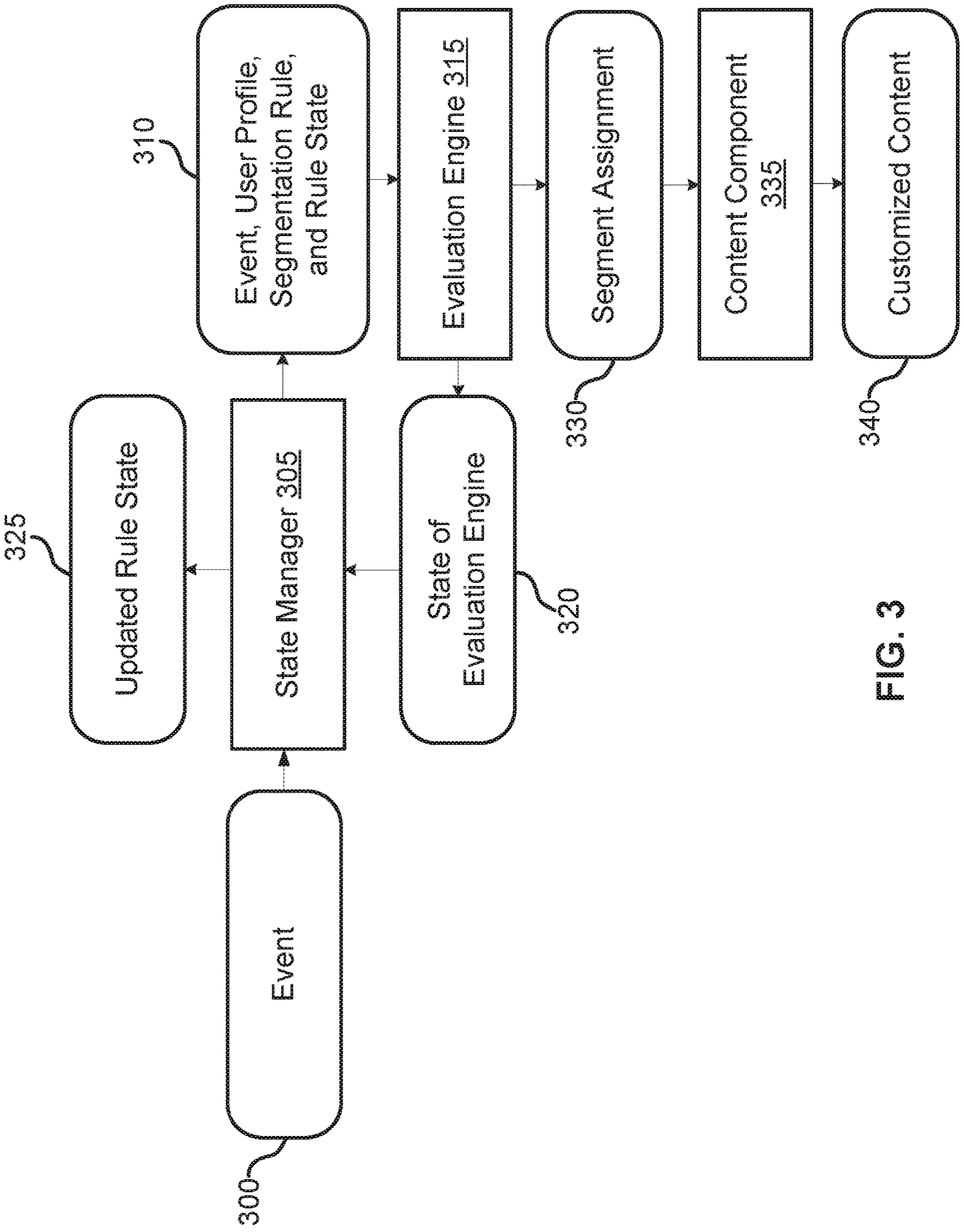
FIG. 3 shows an example of data flow in an event processing apparatus according to aspects of the present disclosure.
Figure 4:
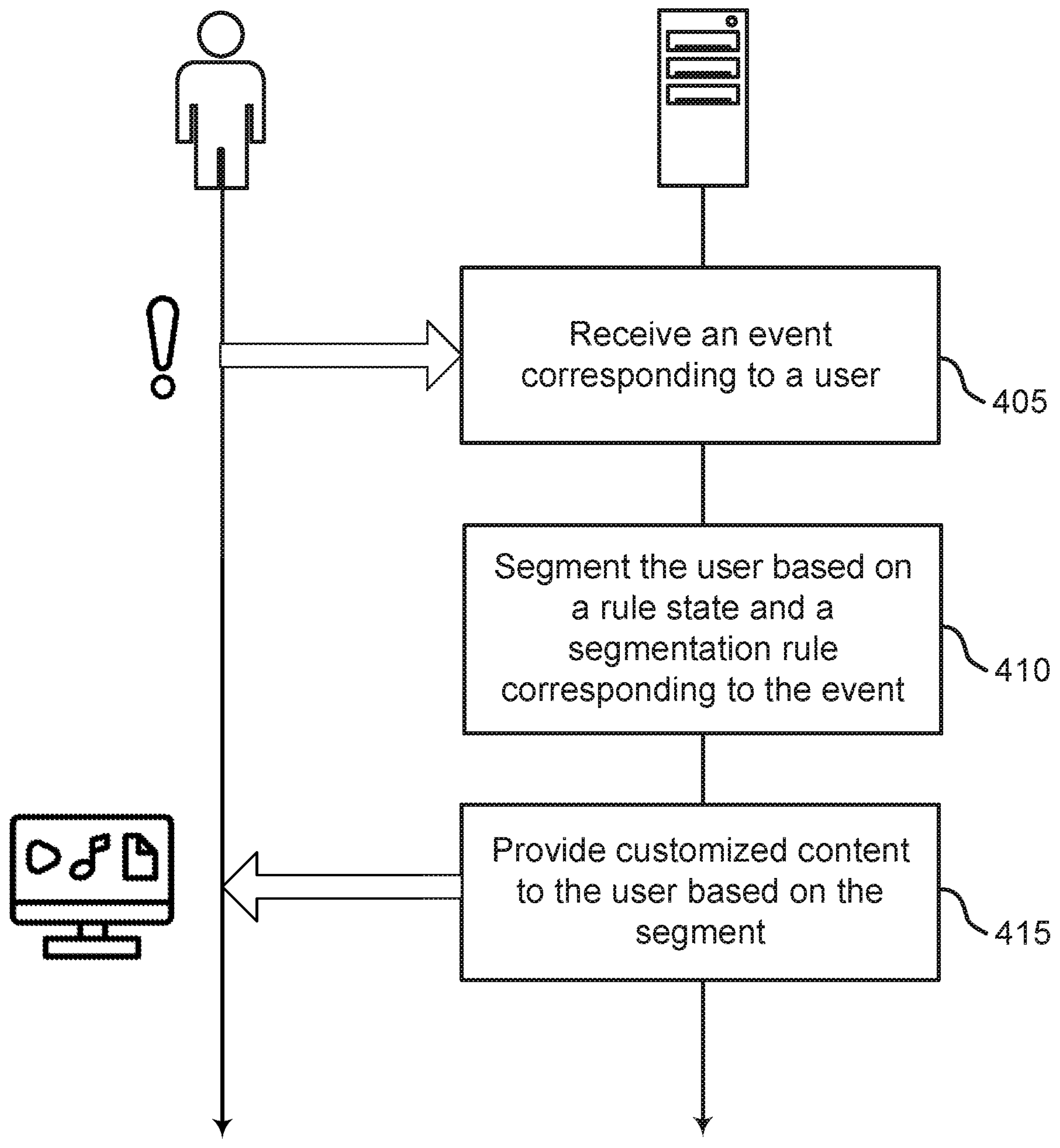
FIG. 4 shows an example of providing customized content according to aspects of the present disclosure.

Example applications of the present disclosure in the customized content distribution context are provided with reference to FIGS. 1 and 4. Example applications of the present disclosure in the record retrieval context are provided with reference to FIGS. 6-7. Details regarding the architecture of the system are provided with reference to FIGS. 1-3. Details regarding a process for event processing are provided with reference to FIGS. 4-5. Details regarding a process for event-based record retrieval are provided with reference to FIGS. 6-7.

Event Processing System

A system and apparatus for event processing is described with reference to FIGS. 1-3. One or more aspects of the system include a processor; a memory storing instructions executable by the processor; a state manager configured to identify a rule state for a user and a segmentation rule that assigns users to a segment based on events from a digital content channel and to update the rule state; an evaluation engine configured to assign the user to the segment by evaluating the segmentation rule based on the rule state and the event from the digital content channel; and a content component configured to provide customized content to the user based on the assignment of the user to the segment.

In some aspects, the state manager is further configured to identify a rule state for a query rule for retrieving records in a database and to update the rule state for the query rule. In some aspects, the apparatus further comprises a query engine configured to receive a query corresponding to the query rule and to retrieve the record from the database by evaluating the query rule based on the rule state in response to the query.

FIG. 1 shows an example of an event processing system according to aspects of the present disclosure. The example shown includes user 100, user device 105, event processing apparatus 110, cloud 115, database 120, and digital content channel 125. Event processing apparatus 110 is an example of, or includes aspects of, the corresponding element described with reference to FIG. 2.

Referring to FIG. 1, according to some aspects, user 100 interacts with digital content channel 125 via user device 105. In an example, digital content channel 125 is a website, and the user interaction is a visit to the website via a web browser included in user device 105. According to some aspects, event processing apparatus 110 receives an event including data related to the user interaction from digital content channel 125 via cloud 115. According to some aspects, event processing apparatus 110 identifies a rule state and a segmentation rule corresponding to the event, evaluates the segmentation rule based on data included in the event, a user profile corresponding to the user, and the rule state, and assigns user 100 to a segment based on the evaluation. According to some aspects, event processing apparatus customizes content for user 100 based on the assignment of user 100 to the user segment and provides the customized content to user 100 via cloud 115 and user device 105. According to some aspects, event processing apparatus 110 updates the rule state based on the evaluation.

According to some aspects, user device 105 is a personal computer, laptop computer, mainframe computer, palmtop computer, personal assistant, mobile device, or any other suitable processing apparatus. In some examples, user device 105 includes software that allows user 100 to interact with digital content channel 125 and to receive customized content from event processing apparatus 110.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, the user interface may be a graphical user interface (GUI).

According to some aspects, event processing apparatus 110 includes a computer implemented network. In some embodiments, event processing apparatus 110 also includes one or more processors, a memory subsystem, a communication interface, an I/O interface, one or more user interface components, and a bus. In some embodiments, event processing apparatus 110 communicates with user device 105, database 120, and digital content channel 125 via cloud 115.

In some cases, event processing apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP) and simple mail transfer protocol (SMTP), although other protocols such as file transfer protocol (FTP) and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Figure 2:
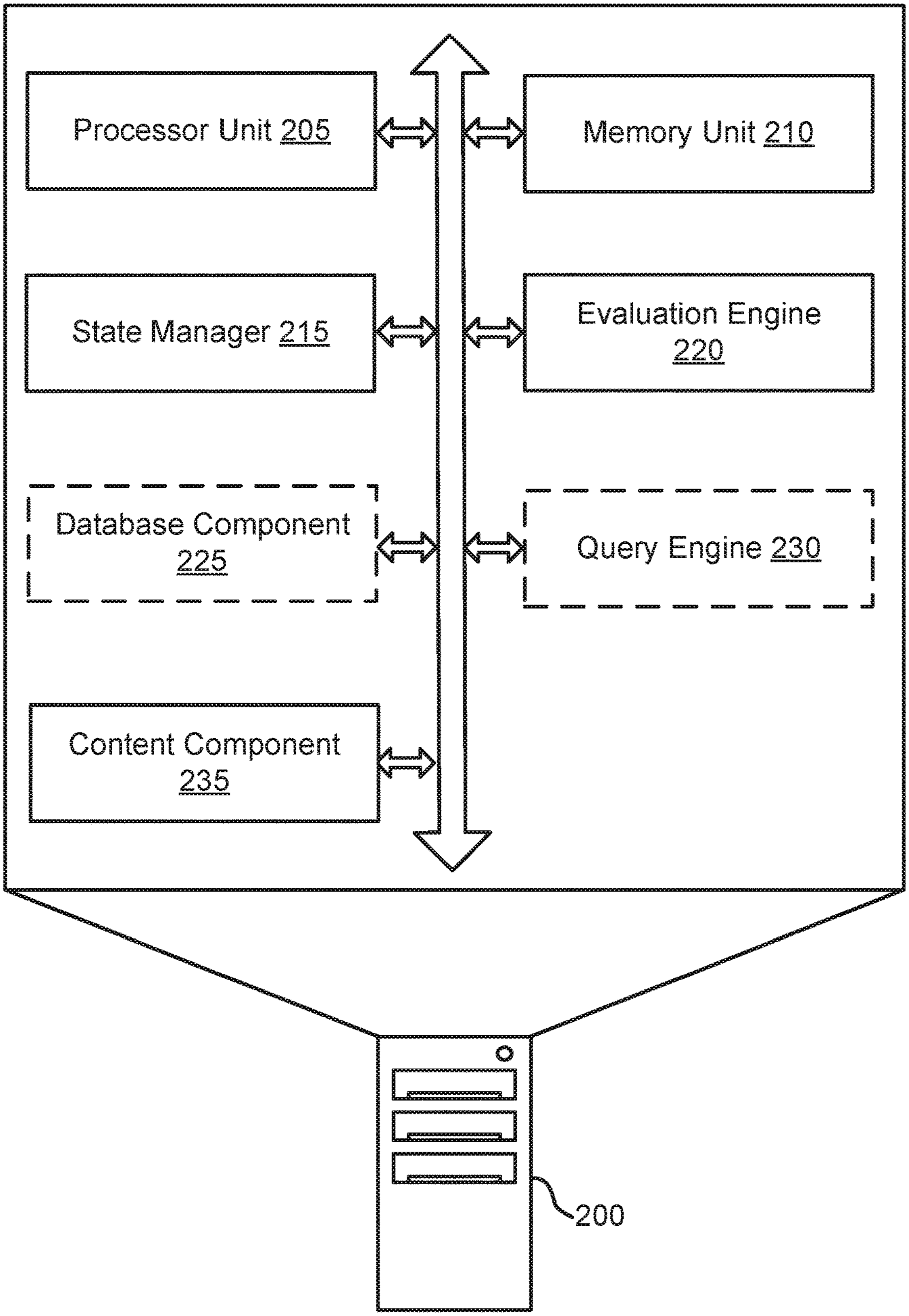
FIG. 2 shows an example of an event processing apparatus according to aspects of the present disclosure.

Further detail regarding the architecture of event processing apparatus 110 is provided with reference to FIGS. 2-3. Further detail regarding a process for event processing is provided with reference to FIGS. 4-5. Further detail regarding a process for event-based record retrieval is provided with reference to FIGS. 6-7.

According to some aspects, cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, event processing apparatus 110, database 120, and digital content channel 125.

According to some aspects, database 120 is an organized collection of data. In some embodiments, database 120 stores data in a specified format known as a schema. According to some aspects, database 120 is structured as a single database, a distributed database, multiple distributed databases, an emergency backup database, or a combination thereof. In some cases, a database controller manages data storage and processing in database 120. In some cases, user 100 interacts with the database controller. In other cases, the database controller operates automatically without user interaction. In some aspects, database 120 is external to event processing apparatus 110 and communicates with event processing apparatus 110 via cloud 115. In some embodiments, database 120 is included in event processing apparatus 110.

FIG. 2 shows an example of an event processing apparatus according to aspects of the present disclosure. Event processing apparatus 200 is an example of, or includes aspects of, the corresponding element described with reference to FIG. 1. In one aspect, event processing apparatus 200 includes processor unit 205, memory unit 210, state manager 215, evaluation engine 220, database component 225, query engine 230, and content component 235.

According to some aspects, processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

According to some aspects, memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, state manager 215 receives an event corresponding to an interaction of a user with a digital content channel. In some examples, state manager 215 identifies a rule state for a user and a segmentation rule that assigns users to a segment. In some examples, state manager 215 updates the rule state.

In some examples, state manager 215 identifies a set of segmentation rules for assigning users to a set of segments based on events from the digital content channel. In some examples, state manager 215 updates a set of rule states corresponding to the set of segmentation rules and a user, respectively, based on the event to obtain a set of updated rule states for the user.

In some examples, state manager 215 stores the event in an event database. In some examples, state manager 215 receives a time stamp associated with the event. In some examples, state manager 215 removes irrelevant data from the rule state based on the time stamp to obtain a clean rule state, where the rule state is updated based on the clean rule state. In some examples, state manager 215 compress the updated rule state to obtain a compressed rule state.

According to some aspects, state manager 215 identifies a rule state for a query rule for retrieving records in the database. In some examples, state manager 215 updates a rule state based on the query rule and the event to obtain an updated rule state. In some examples, state manager 215 identifies a set of node rules corresponding to a set of events stored in the database, where the rule state includes an array of event data corresponding to the set of node rules.

In some examples, state manager 215 identifies a previously met group of node rules corresponding to historical events stored in the database, where the rule state includes an identifier of the previously met group of node rules. In some aspects, the rule state includes a bit set indicating that one or more historical events applies to a node rule. In some aspects, the rule state includes a bit set that maps one or more historical events to a node rule. In some cases, the rule state includes a group of bit sets respectively corresponding to each node rule. In some aspects, the rule state includes at least one of a serialization version identifier. In some aspects, the rule state includes a partial schema of event fields. In some aspects, the rule state includes an identifier of a node rule that corresponds to a time restriction.

According to some aspects, state manager 215 is configured to identify a rule state for a user and a segmentation rule that assigns users to a segment based on events from a digital content channel and to update the rule state. In some aspects, the state manager 215 is further configured to identify a rule state for a record and a query rule for retrieving records in a database and to update the rule state for the query rule.

State manager 215 is an example of, or includes aspects of, the corresponding element described with reference to FIG. 3. According to some aspects, state manager 215 is implemented as one or more hardware circuits, as firmware, as software stored in memory of memory unit 210 and executed by a processor of processor unit 205, or as a combination thereof.

According to some aspects, evaluation engine 220 assigns the user to the segment by evaluating the segmentation rule based on the rule state and the event from the digital content channel.

In some examples, evaluation engine 220 identifies a user profile of the user, where the user is assigned to the segment based on the user profile. In some aspects, the user profile includes dynamic event data that represents the interaction of the user and characteristic data that does not depend on the dynamic event data. In some examples, evaluation engine 220 identifies a user profile for the user, where the segmentation rule is evaluated based on the user profile.

In some examples, evaluation engine 220 evaluates the segmentation rule based on a set of events in the event database including the stored event. In some examples, evaluation engine 220 assigns the user to the segment based on the evaluation of the segmentation rule based on the set of events. In some examples, evaluation engine 220 identifies an event type of the event. In some examples, evaluation engine 220 evaluates the segmentation rule based on the event type.

According to some aspects, evaluation engine 220 is configured to assign the user to the segment by evaluating the segmentation rule based on the rule state and the event from the digital content channel. According to some aspects, evaluation engine 220 is optimized by compiling all segmentation rules including a third-party user identifier corresponding to a given third-party user.

Evaluation engine 220 is an example of, or includes aspects of, the corresponding element described with reference to FIG. 3. According to some aspects, evaluation engine 220 is implemented as one or more hardware circuits, as firmware, as software stored in memory of memory unit 210 and executed by a processor of processor unit 205, or as a combination thereof.

According to some aspects, database component 225 stores an event corresponding to a record in a database. According to some aspects, database component 225 is implemented as one or more hardware circuits, as firmware, as software stored in memory of memory unit 210 and executed by a processor of processor unit 205, or as a combination thereof.

According to some aspects, query engine 230 receives a query corresponding to the query rule. In some examples, query engine 230 retrieves the record from the database by evaluating the query rule based on the rule state in response to the query.

In some examples, query engine 230 identifies a first node rule corresponding to an event type of the event. In some examples, query engine 230 identifies a second node rule corresponding to an event type included in the record. In some examples, query engine 230 evaluates the query rule based on the first node rule and the second node rule.

In some examples, query engine 230 identifies a linking rule that links the first node rule to the second node rule. In some examples, query engine 230 evaluates the query rule based on the linking rule.

In some aspects, query engine 230 is configured to receive a query corresponding to the query rule and to retrieve the record from the database by evaluating the query rule based on the rule state in response to the query.

According to some aspects, query component 230 is implemented as one or more hardware circuits, as firmware, as software stored in memory of memory unit 210 and executed by a processor of processor unit 205, or as a combination thereof.

According to some aspects, database component 225 and query engine 230 are omitted from event processing apparatus 200. According to some aspects, processor engine 205, memory unit 210, state manager 215, database component 225, query engine 230, and content component 235 are included in a different event processing apparatus than event processing apparatus 200.

According to some aspects, content component 235 provides customized content to the user based on the assignment of the user to the segment. According to some aspects, content component 235 provides customized content based on the retrieved record. According to some aspects, content component 235 is configured to provide customized content to the user based on the assignment of the user to the segment.

Content component 235 is an example of, or includes aspects of, the corresponding element described with reference to FIG. 3. According to some aspects, content component 230 is implemented as one or more hardware circuits, as firmware, as software stored in memory of memory unit 210 and executed by a processor of processor unit 205, or as a combination thereof.

FIG. 3 shows an example of data flow in an event processing apparatus according to aspects of the present disclosure. The example shown includes event 300, state manager 305, event, user profile, segmentation rule, and rule state 310, evaluation engine 315, state of evaluation engine 320, updated rule state 325, segment assignment 330, content component 335, and customized content 340.

State manager 305 is an example of, or includes aspects of, the corresponding element described with reference to FIG. 2. Evaluation engine 315 is an example of, or includes aspects of, the corresponding element described with reference to FIG. 2. Content component 335 is an example of, or includes aspects of, the corresponding element described with reference to FIG. 2.

Referring to FIG. 3, according to some aspects, state manager 305 receives event 300. In some cases, event 300 corresponds to a user profile. State manager 305 identifies a segmentation rule and a rule state corresponding to the user profile, and provides event, user profile, segmentation rule, and rule state 310 to evaluation engine 315.

According to some aspects, evaluation engine receives event, user profile, segmentation rule, and rule state 310 and loads the rule state as an internal state. Evaluation engine 310 then evaluates the segmentation rule based on data included in the internal state, the event, and the user profile to determine state of evaluation engine 320. Evaluation engine 315 provides state of evaluation engine 320 to state manager 305, and state manager 305 updates the rule state to include the data included in state of evaluation engine 320 and to omit data that is not included in state of evaluation engine 325.

According to some aspects, evaluation engine 315 determines segment assignment 330 for the user based on the evaluation, and provides segment assignment 330 to content component 335. Content component 335 uses segment assignment 330 to determine that customized content 340 should be provided to the user, and provides customized content 340 to the user based on the determination.

Event Processing

A method for event processing is described with reference to FIGS. 4-6. One or more aspects of the method include receiving an event corresponding to an interaction of a user with a digital content channel; identifying a rule state for a segmentation rule that assigns users to a segment; assigning the user to the segment by evaluating the segmentation rule based on the rule state and the event from the digital content channel; updating the rule state; and providing customized content to the user based on the assignment of the user to the segment.

Some examples of the method further include identifying a plurality of segmentation rules for assigning users to a plurality of segments based on events from the digital content channel. Some examples further include updating a plurality of rule states corresponding to the plurality of segmentation rules, respectively, based on the event to obtain a plurality of updated rule states.

Some examples of the method further include identifying a user profile of the user, wherein the user is assigned to the segment based on the user profile. In some aspects, the user profile includes dynamic event data that represents the interaction of the user and characteristic data that does not depend on the dynamic event data. Some examples of the method, apparatus, non-transitory computer readable medium, and system further include identifying a user profile for the user, wherein the segmentation rule is evaluated based on the user profile.

Some examples of the method further include storing the event in an event database. Some examples further include evaluating the segmentation rule based on a plurality of events in the event database including the stored event. Some examples further include assigning the user to the segment based on the evaluation of the segmentation rule based on the plurality of events.

Some examples of the method further include identifying an event type of the event. Some examples further include evaluating the segmentation rule based on the event type. Some examples of the method further include receiving a time stamp associated with the event. Some examples further include removing irrelevant data from the rule state based on the time stamp to obtain a clean rule state, wherein the rule state is updated based on the clean rule state. Some examples further included determining that the event is irrelevant data based on the updated rule state and removing the event from the event database based on the determination. Some examples of the method further include removing irrelevant data from the event database based on the rule state, where irrelevant data includes an event that will not affect a determination of the rule state. Some examples of the method further include compressing the updated rule state to obtain a compressed rule state. Some examples of the method further include removing the irrelevant data when the segmentation rule is evaluated.

FIG. 4 shows an example of providing customized content according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, the system assigns a user to a segment based on an event that the system receives for the user profile. According to some aspects, the system segments the user by evaluating a segmentation rule based on a rule state for the user and the event. By using the rule state to segment the user, rather than using a naïve approach of storing all historical events associated with the user profile and then retrieving and processing the event for the user profile when the segmentation of the user is to be determined, the system minimizes the amount of data that is used for the segmentation. According to some aspects, the system provides customized content to the user based on the segment. Therefore, due to the speed at which the segmentation is performed by the system, the system can provide customized content to the user in real time. By processing only the latest event, the system saves on computing time and cost.

In an example, a third-party user provides segmentation rules to the system. The segmentation rules include Rule 1, "a user lives in New York", Rule 2, "a user has visited a home page associated with the third-party user", and Rule 3, "a user has visited the home page and then viewed a product". Rule 1 depends on a user profile's characteristic data. Rule 2 depends on a single event. For example, if a user has ever visited the home page, then Rule 2 is satisfied. Otherwise, it is not satisfied. Rule 3 depends on a sequence of events and includes two node rules, Node Rule A and Node Rule B. In this case, Node Rule A is "a user has visited the home page", and Node Rule B is "the user has viewed a product".

A user visits the home page. This visit generates a first event including the user's user identifier and an identifier of the third-party user, and the system receives the first event.

The system retrieves the segmentation rules for the third-party user, including Rules 1-3. In some cases, the system has already cached the segmentation rules for the third-party user into memory and has compiled the segmentation rules into code for optimization in an evaluation engine of the system.

The system determines the user's rule state for the third-party user. In this case, the system has not previously determined a rule state for the user, and the system therefore initializes the rule state for the user as an empty rule state. The system loads the empty rule state as the internal state of the evaluation engine.

In this case, the system identifies characteristic data of the user's profile data. The system determines that the user is from New York and provides the characteristic data to the evaluation engine. The system provides the first event "the user has visited the home page associated with the third-party user" to the evaluation engine, and the evaluation engine beings an evaluation process.

During the evaluation process, the evaluation engine evaluates each segmentation rule at once. In this case, the outcome of the evaluation process is that Rule 1 is satisfied because the user lives in New York, Rule 2 is satisfied because the user has visited the home page, and Rule 3 is not satisfied, as the user has visited the home page but has not viewed a product (i.e., Node Rule A is satisfied but Node Rule B is not satisfied).

The evaluation engine then updates the internal state of the evaluation engine to include the state of each segmentation rule: Rules 1 and 2 are satisfied, and Rule 3 is not because Node Rule B is not satisfied. The system assigns the user to one or more segments corresponding to the satisfaction of Rule 1 and Rule 2.

The system extracts the updated internal state from the evaluation engine to update the rule state. When the system extracts the internal state of the evaluation to update the rule state, the rule state is updated to include portions of the first event, an "always true" state that is set for Rule 2 because Rule 2 has been satisfied, and a bit set for each of Rule 3's two node rules, including a bit set {1} for Node Rule A indicating the event satisfied Node Rule A, and a bit set {0} for Node Rule B indicating the event did not satisfy Node Rule B. No data is included in the updated rule state for Rule 1 because Rule 1 corresponds to characteristic data of a user profile that does not depend on the first event. In this case, the updated rule state is specific to the user's interactions with the third-party user (for example, via the home page).

The user then views a product web page on a website associated with the third-party user, and the view of the product web page generates a second event. In response to receiving the second event, the system looks up the user's rule state for segmentation rules that have been provided by the third-party user, determines that the rule state is the updated rule state, and applies the updated rule state to the evaluation engine. The system looks up the user profile's characteristic data, and the characteristic data indicates that the user is still from New York. The system sends the characteristic data to the evaluation engine.

The system then applies the second event to the evaluation engine, and the evaluation engine performs a second evaluation process. Based on the characteristic data, the updated rule state, and the event, the evaluation engine determines that Node Rule B has been satisfied, the user is still from New York, and that each of Rules 1-3 have therefore been satisfied. The evaluation engine returns "true" for Rules 1-3 and updates the internal state of the evaluation engine accordingly. The system assigns the user to one or more segments corresponding to the satisfaction of Rules 1-3. The system further updates the updated rule state to include an "always true" state for Rules 2 and 3 and does not include information for the satisfaction of Rule 1, as the satisfaction of Rule 1 depends on characteristic data.

In this case, based on the further updated rule state, the system determines that neither the first event nor the second event will be needed for a future evaluation of the segmentation rules provided by the third-party user, and the system therefore removes the first event and the second event from memory (such as an event database). Accordingly, by incrementally updating a rule state in response to an evaluation of segmentation rules, and discarding data that is no longer needed for the evaluation, the system reduces an amount of data that is used for assigning users to user segments, and consequently increases a speed at which a user is assigned to a segment.

At operation 405, the system receives an event corresponding to a user. In some cases, the operations of this step refer to, or may be performed by, an event processing apparatus as described with reference to FIGS. 1 and 2. In some cases, the event processing apparatus receives the event as described with reference to FIG. 5. For example, in some cases, the event processing apparatus receives an event corresponding to an interaction of a user with a digital content channel from a user device of the user.

At operation 410, the system segments the user based on a rule state and a segmentation rule corresponding to the event. In some cases, the operations of this step refer to, or may be performed by, an event processing apparatus as described with reference to FIGS. 1 and 2. In some cases, the event processing apparatus segments the user based on the rule state and the segmentation rule corresponding to the event as described with reference to FIG. 5.

At operation 415, the system provides customized content to the user based on the segment. In some cases, the operations of this step refer to, or may be performed by, an event processing apparatus as described with reference to FIGS. 1 and 2. In some cases, the event processing apparatus provides customized content to the user based on the segment as described with reference to FIG. 5.

Figure 5:
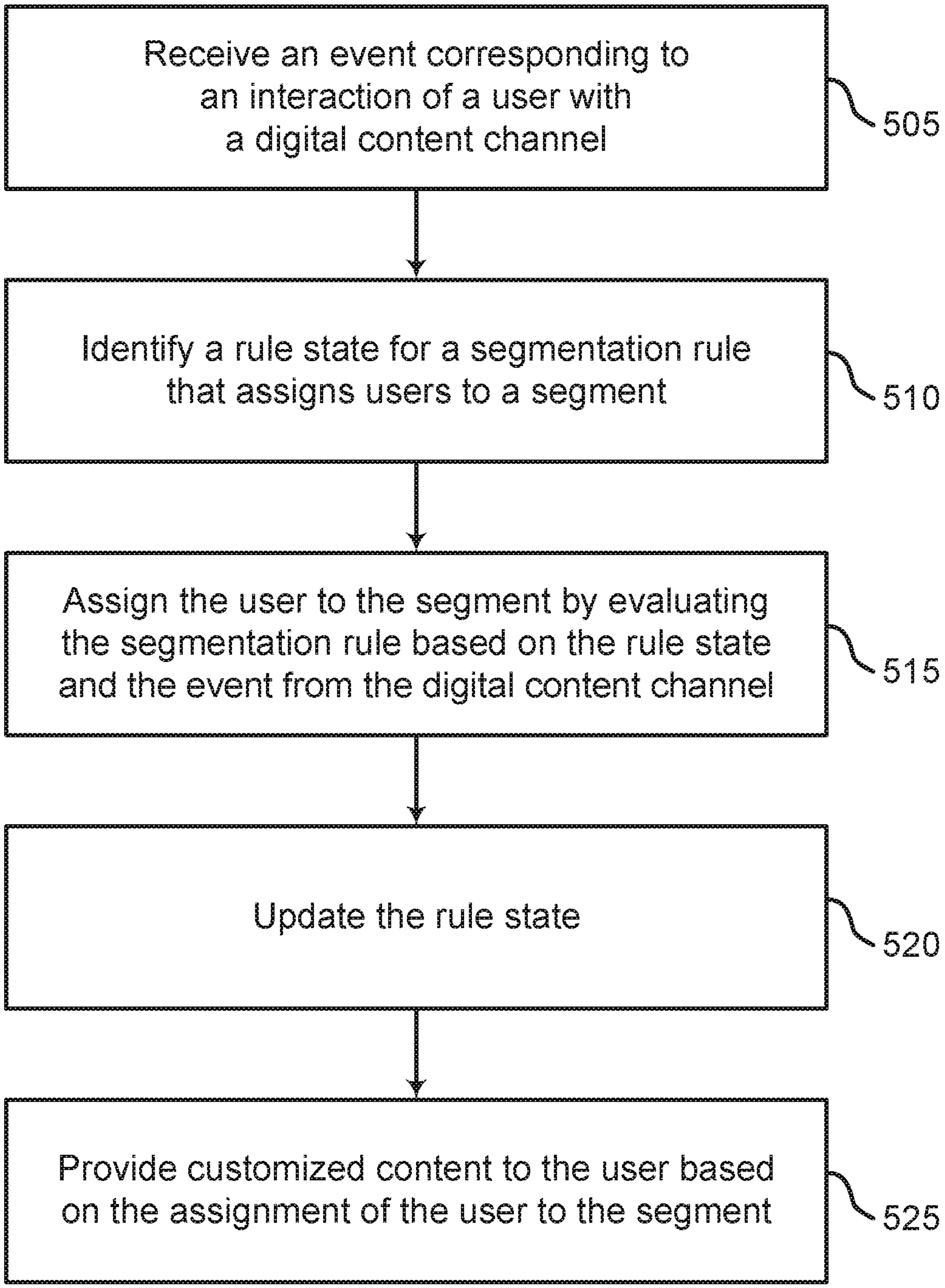
FIG. 5 shows an example of event processing according to aspects of the present disclosure.

FIG. 5 shows an example of event processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, the system uses an incoming event corresponding to a user interaction with a digital content channel and a rule state corresponding to the user to evaluate a segmentation rule for the user. According to some aspects, the user is assigned to a segment based on the evaluation of the segmentation rule. By using the rule state to determine that the user is to be assigned to the segment, the system minimizes the amount of data that is stored for making the assignment, as well as enabling the user to be assigned to the segment in real time. According to some aspects, the system customizes content for the user based on the assignment of the user to the segment, and provides the customized content to the user. As the user is assigned to the segment in real time in response to the event, the customized content can also be provided to the user in real time, thereby avoiding a delay the user may experience in receiving the customized content in response to the interaction with the digital content channel.

At operation 505, the system receives an event corresponding to an interaction of a user with a digital content channel. In some cases, the operations of this step refer to, or may be performed by, a state manager as described with reference to FIGS. 2 and 3. For example, in some cases the system monitors a digital content channel (via identifying information, such as a cookie and the like, provided from the digital content channel and/or a user device that interacts with the digital content channel) to receive the event corresponding to the interaction of the user with the digital content channel. In some cases, the digital content channel provides the event to the system. According to some aspects, the system receives a set of events from the digital content channel. According to some aspects, the system provides a received event to the state manager.

According to some aspects, an event includes data that identifies: a digital content channel; a user; a user device; an interaction description (including a predetermined "type" of the interaction, such as a home page view, an add-to-cart interaction, a purchase, etc.); a time stamp indicating a date and/or time at which the interaction occurred; or a combination thereof. In some cases, the event includes a third-party user identifier, where the third-party user identifier identifies a third-party user that is associated with the digital content channel. For example, in some cases, the third-party user operates the digital content channel, or provides content via the digital content channel. According to some aspects, the state manager stores the event in an event database (e.g., a database as described with reference to FIG. 1).

At operation 510, the system identifies a rule state for a user and a segmentation rule that assigns users to a segment. In some cases, the operations of this step refer to, or may be performed by, a state manager as described with reference to FIGS. 2 and 3.

In some cases, in response to receiving the one or more events, the state manager identifies a third-party user and a user profile corresponding to identifiers included in the event. In some cases, the user profile includes dynamic event data that represents the interaction of the user and characteristic data that might not depend on the dynamic event data. According to some aspects, the state manager interprets the event as a change to the user profile and updates the dynamic data of the user profile based on corresponding data included in the event. In some cases, the segmentation rule is based on the dynamic event data. In some cases, the segmentation rule is based on the dynamic event data and the characteristic data.

In some cases, in response to receiving the event, the state manager retrieves a rule state corresponding to the user profile from a database (such as the database described with reference to FIG. 1). According to some aspects, if the rule state corresponds to a user profile that is not associated with an event, the rule state begins as an empty rule state. In some cases, the state manager retrieves characteristic data of the user profile from the database. According to some aspects, the state manager reads the user profile.

In some cases, the rule state includes a unique serialization identifier for data represented in the rule state, thereby ensuring backwards-compatibility when a component of the system reads rule state data stored in a previous rule state. In some cases, the rule state includes a partial schema (e.g., a subset) of event fields that are used to evaluate linking rules. In some cases, the rule state includes an array of all events that match one or more node rules and that are part of a group of node rules that are not yet collectively satisfied. In some cases, the rule state includes a unique identifier of any node rule or any group of node rules that has previously been satisfied and will always be satisfied.

In some cases, the rule state includes a unique identifier of any node rule or any group of node rules that has previously been satisfied but that also has time restrictions. In some cases, the rule state includes a set of bits sets that indicate which events in an array of events apply to each node rule, thereby allowing events that satisfy multiple node rules to share common event data. In some cases, the rule state incudes future time dependence information for a group of node rules that indicates when the group of node rules will be satisfied in the future if no other events arrive. According to some aspects, the rule state is used to evaluate the segmentation rule.

In some cases, the state manager identifies a previously met group of node rules corresponding to a historical event stored in the database, where the rule state includes an identifier of the previously met group of node rules. In some cases, a previously met group of node rules indicates that a group of node rules has been satisfied in the past and will always remain satisfied. In some cases, the rule state includes a bit set that maps one or more historical events to a node rule. In some cases, the rule state includes a group of bit sets respectively corresponding to each node rule. In some cases, the rule state includes a serialization version identifier. In some cases, aspects, the rule state includes an identifier of a node rule that corresponds to a time restriction for a group of node rules.

In some cases, the state manager removes irrelevant data from the rule state based on the time stamp of the event or based on a time at which a segmentation rule is evaluated to obtain a clean rule state. For example, in some cases, irrelevant data is data that can no longer affect an evaluation of a segmentation rule based on a time of the time stamp, thereby minimizing the amount of unnecessary data stored in the clean rule state.

In some cases, in response to receiving the event, the state manager retrieves a segmentation rule corresponding to the event or to the user profile from a database (such as the database described with reference to FIG. 1). According to some aspects, the state manager retrieves a segmentation rule that corresponds to a third-party user based on a third-party user identifier included in the event. For example, in some cases, the third-party user has provided the segmentation rule to the system, and an association of the third-party user with the segmentation rule is stored in the database. According to some aspects, the state manager retrieves the segmentation rule according to a query language.

According to some aspects, the state manager identifies a set of segmentation rules for assigning users to a set of segments based on the set of events from the digital content channel. In some cases, the set of segmentation rules is provided to the system by a third-party user. According to some aspects, the set of segmentation rules is stored in a database (such as the database as described with reference to FIG. 1). According to some aspects, the state manager retrieves each segmentation rule provided by a third-party user corresponding to the event from the database and identifies a segmentation rule from among the segmentation rules. According to some aspects, the state manager retrieves each segmentation rule from a database that corresponds to a third-party user identifier included in the event. For example, in some cases, a segmentation rule is associated with a third-party user identifier in the database via a data schema, thereby enabling the segmentation rule to be retrieved based on the third-party user identifier. According to some aspects, the state manager identifies a set of segmentation rules for assigning users to a set of segments based on events from the digital content channel.

According to some aspects, a segmentation rule includes one or more node rules. For example, in some cases, the state manager identifies a set of node rules corresponding to a set of events stored in the database, where the rule state includes an array of event data corresponding to the set of node rules. An example of a segmentation rule that includes a first node rule A and a second node rule B is the following:

```
(profile_state = "California") &&                    (1)
  CHAIN x:events(
  A (eventType = "view");
  B (eventType = "purchase")
  WHERE(A.get(0).product == B.get(0).product);
  )
```

Referring to (1), the segmentation rule indicates that "a user from California who views a product and then purchases the product" should be assigned to a corresponding segment. In some cases, (1) can also include information that constrains a node rule within a time limit, such that the node rule is satisfied when the purchase occurs within a predetermined time of the view. In an example, (1) could include a node rule C indicating that "a user who purchases the product within three days of viewing the product" should be assigned to a corresponding segment.

Node rule A is a node rule including a field called "eventType" having a value of "view" corresponding to viewing the product, and node rule B is a node rule including an "eventType" field having a value of "purchase" corresponding to a purchase of the product. In this case, the segmentation rule includes a conjunctive predicate that represents the characteristic data "a user from California", and the node rules correspond to dynamic event data.

According to some aspects, in response to receiving the event, the state manager stores the event in an event database (such as the database described with reference to FIG. 1). According to some aspects, the state manager provides the event(s), the rule state (or the clean rule state), the segmentation rule and/or segmentation rules retrieved from the database, and the user profile to an evaluation engine as described with reference to FIGS. 2 and 3.

At operation 515, the system assigns the user to the segment by evaluating the segmentation rule based on the rule state and the event from the digital content channel. In some cases, the operations of this step refer to, or may be performed by, an evaluation engine as described with reference to FIGS. 2 and 3.

According to some aspects, in response to receiving the event(s), the rule state, the segmentation rule(s), and the user profile, the evaluation engine loads the rule state (or the clean rule state) as an internal state of the evaluation engine (for example, by including data included in the rule state in the internal state), and evaluates the segmentation rule(s) by determining if data included in the internal state, the event, and/or the user profile satisfies a condition or conditions of the segmentation rule, or a node rule or a group of node rules included in the segmentation rule. For example, in some cases, an internal data schema of the evaluation engine is initialized using the rule state or the clean rule state. In some cases, the state manager instructs the evaluation engine to load the rule state as the internal state of the evaluation engine, thereby priming the evaluation engine with the rule state.

According to some aspects, the set of rule states corresponds to a set of users and a set of third-party users, respectively. According to some aspects, the set of rule states are grouped together in a database (such as the database as described with reference to FIG. 1) according to corresponding users and third-party users to save storage space.

In some cases, for example, the evaluation engine identifies an event type of the event based on data included in the event or in the internal state, and evaluates the segmentation rule based on the event type (e.g., by determining if the event type satisfies the segmentation rule). According to some aspects, the evaluation engine evaluates the segmentation rule based on a set of events in the event database including the stored event.

According to some aspects, the evaluation engine identifies a first node rule, identifies a second node rule, and evaluates the segmentation rule based on the first node rule and the second node rule. In some cases, the evaluation engine identifies the first and second node rules by identifying the segmentation rule.

For example, in some cases, the segmentation rule is associated with a group of node rules (such as a group including a first node rule and a second node rule). According to some aspects, an ordering of two node rules within a segmentation rule is interpreted by the evaluation engine as meaning a node rule followed by a node rule. For example, in some cases, for a group of node rules including a node rule A and a node rule B to be satisfied, a last event that matches node rule A must occur prior to a first event that matches a second node rule B.

According to some aspects, the evaluation engine identifies a linking rule that links the first node rule to the second node rule, and evaluates the segmentation rule based on the linking rule. "WHERE(A.get(0).product==B.get(0).product)" included in (1) is an example of a linking rule. In this case, the linking rule is a lambda expression (e.g., a short block of code that takes in parameters and returns a value), and the linking rule means that a first event (e.g. a zero-indexed event) that satisfies node rule A must have a field called "product" having a value that is the same as a product field of a zero-indexed event that satisfies a predicate in node rule B, thereby ensuring that whatever product is purchased by the user must also have been viewed by the user. Accordingly, rather than representing a cycle of events corresponding to a linked group of node rules by an individual state machine, the evaluation engine can save a corresponding event field of each event that satisfies a predicate portion of each node rule, and once the entirety of the linked group of node rules is satisfied, the corresponding event data can be discarded.

According to some aspects, the evaluation engine determines that the event is irrelevant data in response to evaluating the segmentation rule(s). For example, the evaluation engine determines that the event cannot affect the evaluation of the segmentation rule(s) and is therefore irrelevant data. In some cases, the evaluation engine provides the determination to the state manager, and the state manager removes the irrelevant data from the event database (such as the database as described with reference to FIG. 1).

According to some aspects, assigns the user to the segment based on the evaluation of the segmentation rule. According to some aspects, the evaluation engine assigns the user to the segment based on the evaluation of the segmentation rule based on the set of events. For example, in response to determining that the internal state of the evaluation engine and the event include data that satisfies a segmentation rule, a node rule included in the segmentation rule, or a group of node rules included in the segmentation rule, the evaluation engine assigns the user to a segment corresponding to the satisfied segmentation rule, node rule included in the segmentation rule, or group of node rules included in the segmentation rule. In some cases, the evaluation engine stores data indicating the assignment of the user to the segment in a database (such as a database as described with reference to FIG. 1). For example, the data may include a user identifier for the user, a segment identifier, and an association of the user identifier with a segment identifier. In some cases, the evaluation engine includes the user identifier for the user, a segment identifier, and an association of the user identifier with a segment identifier in the internal state.

According to some aspects, the evaluation engine assigns the user to the segment based on the user profile. For example, in some cases, the state manager receives a change in characteristic data of the user profile (such as data indicating a change in a user device, a change in the location of the user device, etc.) and provides the changed characteristic data to the evaluation engine. According to some aspects, the evaluation engine evaluates the segmentation rule based on the internal state and the changed characteristic data for the user profile. For example, in response to determining that the internal state of the evaluation engine and changed characteristic data for the user profile include data that satisfies a segmentation rule, a node rule included in the segmentation rule, or a group of node rules included in the segmentation rule, the evaluation engine assigns the user to a segment corresponding to the satisfied segmentation rule, node rule included in the segmentation rule, or group of node rules included in the segmentation rule.

At operation 520, the system updates the rule state. In some cases, the operations of this step refer to, or may be performed by, a state manager as described with reference to FIGS. 2 and 3. In some cases, the state manager updates a set of rule states corresponding to the set of segmentation rules, respectively, based on the event to obtain a plurality of updated rule states.

According to some aspects, in response to evaluating the segmentation rule, the evaluation engine updates the internal state of the evaluation engine to include the event, data indicating that a node rule, a group of node rules, a segmentation rule, or a combination thereof is satisfied, and information from the user profile that was used in evaluating the segmentation rule. In some cases, the updated internal state of the evaluation engine includes any future time dependence information for a group of node rules that indicates when the group of node rules will be satisfied in the future if no other events arrive. In some cases, the future time dependence information is a binary function of time.

In some cases, the evaluation engine removes irrelevant data from the updated internal state of the evaluation engine. For example, in some cases, irrelevant data is data that can no longer affect an evaluation of a segmentation rule based on a time of the time stamp, thereby minimizing the amount of unnecessary data stored in the updated internal state.

According to some aspects, the updated internal state of the evaluation engine includes data indicating the segment membership of the user. In some cases, a segment membership of a user is used as a predicate in a segmentation rule. For example, a segment of users such as "frequent flier members" can be combined with another segment such as "users who bought an airline ticket in the last month" to form another segment called "frequent fliers who bought an airline ticket in the last month", and a corresponding segmentation rule can be formed. In some cases, the state manager stores historical segment membership in the rule state.

In some cases, in response to updating the internal state of the evaluation engine, the evaluation engine provides the updated internal state to the state manager. According to some aspects, the state manager receives the updated internal state of the evaluation engine and updates the rule state to include information included in the updated internal state of the evaluation engine. For example, in some cases, the state manager updates the rule state to include current values (as included in the updated internal state of the evaluation engine) for the unique serialization identifier for data represented in the rule state, the partial schema of event fields that are used to evaluate linking rules, the array of all events that match one or more node rules and that are part of a group of node rules that are not yet collectively satisfied, the unique identifier of any node rule or any group of node rules that is satisfied and will always be satisfied, the unique identifier of any node rule or any group of node rules that is satisfied but that also have time restrictions, the set of bits sets that indicate which events in the array of events apply to each node rule, future time dependence information for a group of node rules that indicates when the group of node rules will be satisfied in the future if no other events arrive, other information included in the updated internal state of the evaluation engine, or a combination thereof.

According to some aspects, the state manager compresses and serializes the updated rule state to obtain a compressed rule state. For example, in a case where a set of a group of node rules are included in a set of segmentation rules, and the set of the group of node rules includes a set of linking clauses, the updated rule state may include a portion of a set of events that match only some node rules of a group of node rules. When a group of node rules is satisfied, the state manager can remove events from the updated rule state, the event database, or a combination thereof if they do not satisfy another group of node rules. In some cases, the state manager applies compression to binary information included in the updated rule state, thereby further compressing the size of the rule state to reduce an amount of data that is stored by the system.

According to some aspects, the state manager stores the updated rule state in a database (such as a database as describe with reference to FIG. 1). Accordingly, by updating the rule state to an updated rule state that includes a minimal amount of data, a user can be assigned to a segment based on a future event by determining if a segmentation rule for the future event is satisfied by the future event and the updated rule state, rather than by comparing the segmentation rule with all the data from each historical event that the system has received for the user. By storing the updated internal state of the evaluation engine for a user profile as an updated rule state, the state manager allows the evaluation engine to load different rule states corresponding to different users and different third-party users as internal evaluation states, thereby allowing the evaluation engine to evaluate different segmentation rules for the different users.

At operation 525, the system provides customized content to the user based on the assignment of the user to the segment. In some cases, the operations of this step refer to, or may be performed by, a content component as described with reference to FIGS. 2 and 3. For example, in some cases, the content component customizes content (such as an item of media including text, audio, an image, video, or a combination thereof, or a communication, such as a text message, an email, an application notification, etc.) by matching the content to a segment of users. In some cases, the content is retrieved from a database, or from another storage source. For example, in some cases, the database stores a content identifier, and in response to the user being assigned to the segment, the content component retrieves the segment identifier associated with the user identifier from the database, and associates the user identifier, the segment identifier, and the content identifier. In some cases, in response to matching a user identifier and a content identifier, the content component provides the customized content to the user. In some cases, the content component provides the customized content via a content channel corresponding to the event, or provides the customized content via a different content channel.

According to some aspects, in response to assigning the user to a segment, the segmentation engine provides data relating to the user and the segment to an external content providing system, or to a third-party user.

Event-Based Record Retrieval

A method for event processing is described with reference to FIGS. 6-7. One or more aspects of the method include storing, by a database component, an event corresponding to a record in a database; identifying, by the state manager, a rule state for a query rule for retrieving records in the database; receiving, by a query engine, a query corresponding to the query rule; retrieving, by the query engine, the record from the database by evaluating the query rule based on the rule state in response to the query; updating, by the state manager, the rule state; and providing, by a content component, customized content based on the retrieved record.

Some examples of the method further include identifying a first node rule corresponding to an event type of the event. Some examples further include identifying a second node rule corresponding to an event type included in the record. Some examples further include evaluating the query rule based on the first node rule and the second node rule.

Some examples of the method further include identifying a linking rule that links the first node rule to the second node rule. Some examples further include evaluating the query rule based on the linking rule. Some examples of the method further include identifying a plurality of node rules corresponding to a plurality of events stored in the database, wherein the rule state includes an array of event data corresponding to the plurality of node rules.

Some examples of the method further include identifying a previously met group of node rules corresponding to a historical event stored in the database, wherein the rule state includes an identifier of the previously met group of node rules. In some aspects, the rule state includes a bit set indicating that a historical event applies to a node rule. In some aspects, the rule state includes a bit set that maps one or more historical events to a node rule. In some cases, the rule state includes a group of bit sets respectively corresponding to each node rule. In some aspects, the rule state includes at least one of a serialization version identifier. In some aspects, the rule state includes a partial schema of event fields. In some aspects, the rule state includes an identifier of a node rule that corresponds to a time restriction.

Figure 6:
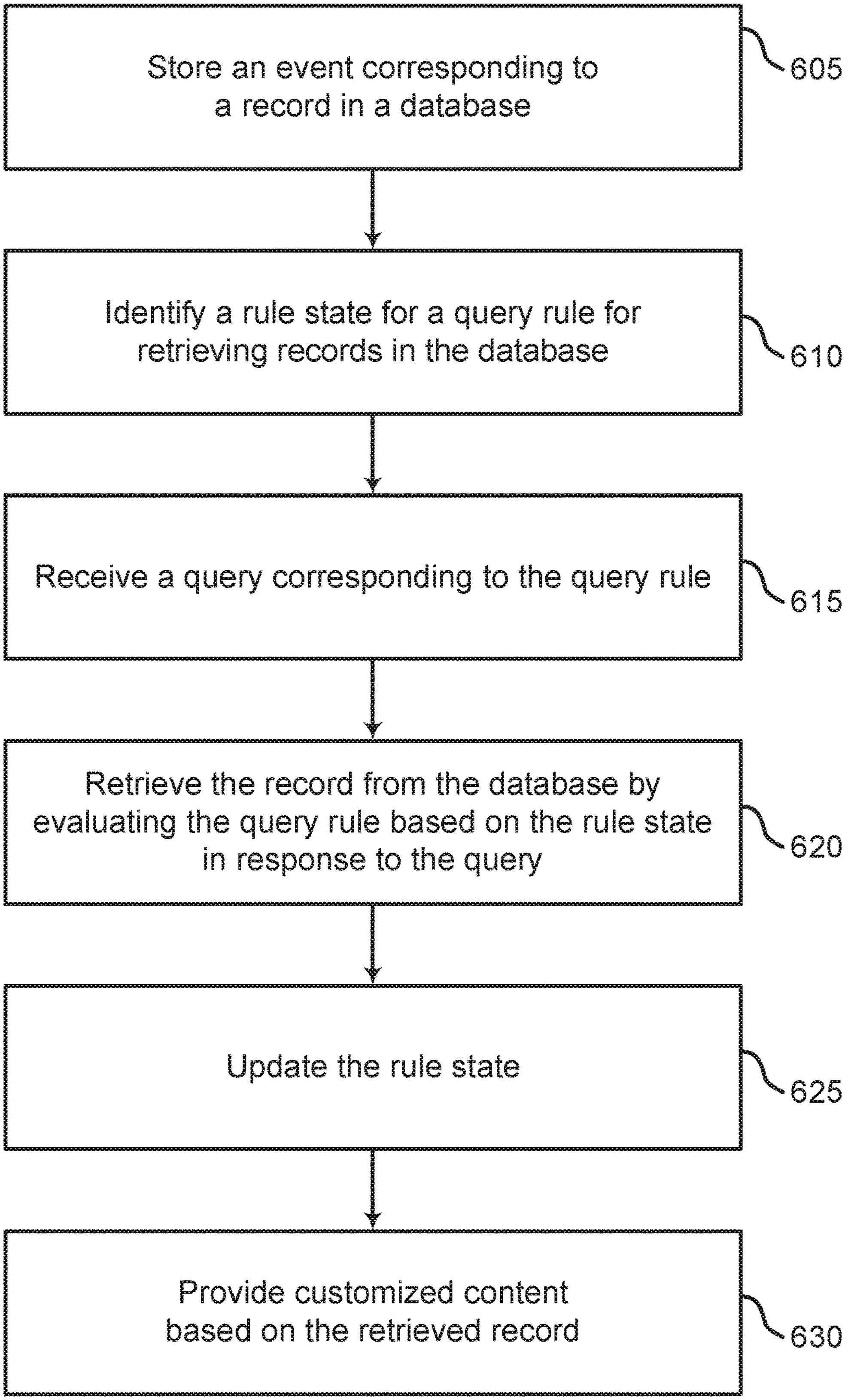
FIG. 6 shows an example of event-based record retrieval according to aspects of the present disclosure.

FIG. 6 shows an example of event-based record retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system uses an incoming event to update a rule state for identifying a record in a database. According to some aspects, the event corresponds to a query rule, where a record corresponding to the query rule is identified when the query rule is satisfied. According to some aspects, the satisfaction of the query rule is used to update a rule state to obtain an updated rule state. According to some aspects, the system checks the updated rule state to identify and retrieve a record corresponding to the updated rule state from a database. By using the updated rule state to retrieve the record, the system minimizes the amount of data that is stored for record retrieval, as well as enabling the record to be retrieved in real time in response to a query corresponding to the query rule.

At operation 605, the system stores an event corresponding to a record in a database. In some cases, the operations of this step refer to, or may be performed by, a database component as described with reference to FIGS. 2 and 3. For example, in some cases the database component monitors a content channel (via identifying information, such as a cookie and the like, provided from the content channel and/or a user device that interacts with the content channel, for example via geofencing) to receive the event corresponding to an interaction of a user with the content channel. In some cases, the content channel provides the event to the content channel.

According to some aspects, an event includes data that identifies: a digital content channel; a user; a user device; an interaction description (including a predetermined “type” of the interaction, such as a home page view, an add-to-cart interaction, a purchase, etc.); a time stamp indicating a date and/or time at which the interaction occurred; or a combination thereof. In some cases, the event includes a third-party user identifier, where the third-party user identifier identifies a third-party user that is associated with the digital content channel. For example, in some cases, the third-party user operates the digital content channel, or provides content via the digital content channel. According to some aspects, the state manager stores the event in an event database (e.g., a database as described with reference to FIG. 1).

At operation 610, the system identifies a rule state for a query rule for retrieving records in the database. In some cases, the operations of this step refer to, or may be performed by, a state manager as described with reference to FIGS. 2 and 3.

In some cases, in response to receiving the event, the state manager identifies a third-party user and a record corresponding to identifiers included in the event. In some cases, the record includes dynamic event data that represents the interaction of a user and characteristic data that might not depend on the dynamic event data. According to some aspects, the state manager interprets the event as a change to the record and updates the dynamic data of the record based on corresponding data included in the event. In some cases, the query rule is based on the dynamic event data. In some cases, the query rule is based on the dynamic event data and the characteristic data. In some cases, a set of query rules including the query rule is provided to the system by a third-party user. According to some aspects, the set of query rules is stored in a database (such as the database as described with reference to FIG. 1).

According to some aspects, in response to the database component storing the event, the state manager retrieves a rule state corresponding to the event from a database (such as the database described with reference to FIG. 1). According to some aspects, if the rule state corresponds to a record that is not associated with an event, the rule state begins as an empty rule state. In some cases, the state manager retrieves characteristic data of the record from the database. According to some aspects, the state manager reads the record.

In some cases, the rule state includes a unique serialization identifier for data represented in the rule state, thereby ensuring backwards-compatibility when a component of the system reads rule state data stored in a previous rule state. In some cases, the rule state includes a partial schema (e.g., a subset) of event fields that are used to evaluate linking rules. In some cases, the rule state includes an array of all events that match one or more node rules and that are part of a group of node rules that are not yet collectively satisfied. In some cases, the rule state includes a unique identifier of any node rule or any group of node rules that has previously been satisfied and will always be satisfied. In some cases, the rule state includes a unique identifier of any node rule or any group of node rules that has previously been satisfied but that also has time restrictions. In some cases, the rule state includes a set of bits sets that indicate which events in an array of events apply to each node rule, thereby allowing events that satisfy multiple node rules to share common event data. In some cases, the rule state incudes future time dependence information for a group of node rules that indicates when the group of node rules will be satisfied in the future if no other events arrive. According to some aspects, the rule state is used to evaluate the query rule.

In some cases, the state manager identifies a previously met group of node rules corresponding to a historical event stored in the database, where the rule state includes an identifier of the previously met group of node rules. In some cases, a previously met group of node rules indicates that a group of node rules has been satisfied in the past and will always remain satisfied. In some cases, the rule state includes a bit set indicating that a historical event applies to a node rule. In some aspects, the rule state includes a bit set that maps one or more historical events to a node rule. In some cases, the rule state includes a group of bit sets respectively corresponding to each node rule. In some cases, the rule state includes a serialization version identifier. In some cases, aspects, the rule state includes an identifier of a node rule that corresponds to a time restriction.

According to some aspects, the state manager receives a time stamp associated with the event. In some cases, the state manager removes irrelevant data from the rule state based on the time stamp to obtain a clean rule state. For example, in some cases, irrelevant data is data that can no longer affect an evaluation of a query rule based on a time of the time stamp, thereby minimizing the amount of unnecessary data stored in the clean rule state.

In some cases, in response to the database component storing the event, the state manager retrieves one or more query rules corresponding to the event, the user profile, a third-party user associated with the event, or a combination thereof from a database (such as the database described with reference to FIG. 1). According to some aspects, the state manager retrieves one or more query rules that corresponds to a third-party user based on a third-party user identifier included in the event. For example, in some cases, the third-party user has provided the query rule to the system, and an association of the third-party user with the query rule is stored in the database. According to some aspects, the state manager retrieves the query rule according to a query language.

According to some aspects, the state manager identifies a set of query rules for retrieving records based on a set of events from the content channel. According to some aspects, the state manager retrieves each query rule corresponding to the events from a database (such as the database described with reference to FIG. 1) and identifies a query rule from among the query rules. According to some aspects, the state manager retrieves each query rule from a database that corresponds to a third-party user identifier included in the event. For example, in some cases, a query rule is associated with a third-party user identifier in the database via a data schema, thereby enabling the query rule to be retrieved based on the third-party user identifier. According to some aspects, the state manager identifies a set of query rules for retrieving records based on events from the content channel.

According to some aspects, a query rule includes one or more node rules. For example, in some cases, the state manager identifies a set of node rules corresponding to a set of events stored in the database, where the rule state includes an array of event data corresponding to the set of node rules. An example of a query rule that includes a first node rule A and a second node rule B is the following:

```
(profile_state = "New York") &&                    (2)
  CHAIN x:events(
  A (eventType = "view");
  B (eventType = "purchase")
  WHERE(A.get(0).product == B.get(0).product);
  )
```

Referring to (2), the query rule indicates that a record corresponding to "a user from New York who views a product and then purchases the product" can be retrieved according to a query that matches the query rule. In some cases, (2) can also include information that constrains a node rule within a time limit, such that the node rule is satisfied when the purchase occurs within a predetermined time of the view. In an example, (2) could include a node rule C indicating that a record corresponding to "a user who purchases the product within three days of viewing the product" could be retrieved in response to a matching query.

Node rule A is a node rule including a field called "eventType" having a value of "view" corresponding to viewing the product, and node rule B is a node rule including an "eventType" field having a value of "purchase" corresponding to a purchase of the product. In this case, the query rule includes a conjunctive predicate that represents the characteristic data "a user from New York", and the node rules correspond to dynamic event data.

According to some aspects, the state manager identifies a set of query rules for retrieving records based on events. According to some aspects, the state manager retrieves each query rule corresponding to the events from a database (such as the database described with reference to FIG. 1) and identifies a query rule from among the query rules. According to some aspects, the state manager retrieves each query rule from a database that corresponds to a third-party user identifier included in the event. For example, in some cases, a query rule is associated with a third-party user identifier in the database via a data schema, thereby enabling the query rule to be retrieved based on the third-party user identifier.

According to some aspects, the state manager provides the event, the rule state (or the clean rule state), the query rule and/or query rules retrieved from the database to a query engine as described with reference to FIG. 2.

At operation 615, the system receives a query corresponding to the query rule. In some cases, the operations of this step refer to, or may be performed by, a query engine as described with reference to FIG. 2. For example, in some cases, a user of the system (such as the third-party user) provides the query to the query engine via a user device as a request to retrieve a record that satisfies the updated rule state. In some cases, the query includes information that matches a query rule, such that a record that satisfies the query rule can be retrieved in response to the query. In some cases, the query is a request to return a record that satisfies a query rule corresponding to the query.

At operation 620, the system retrieves the record from the database by evaluating the query rule based on the rule state in response to the query. In some cases, the operations of this step refer to, or may be performed by, a query engine as described with reference to FIG. 2.

According to some aspects, in response to receiving the event, the rule state, and the query rule, the query engine loads the rule state (or the clean rule state) as an internal state of the query engine (for example, by including data included in the rule state in the internal state), and determines if data included in the internal state and in the event satisfies a condition or conditions of the query rule, or a node rule or a group of node rules included in the query rule. For example, in some cases, an internal data schema of the query engine is initialized using the rule state or the clean rule state. In some cases, the state manager instructs the query engine to load the rule state as the internal state of the query engine, thereby priming the query engine with the rule state.

In some cases, for example, the query engine identifies an event type of the event based on data included in the event or in the internal state, and evaluates the query rule based on the event type (e.g., by determining if the event type satisfies the query rule). According to some aspects, the query engine evaluates the query rule based on a set of events in the event database including the stored event.

According to some aspects, the query engine evaluates the query rule based on a first node rule and a second node rule as described with reference to FIG. 7. According to some aspects, the state manager identifies a set of node rules corresponding to a set of events stored in the database, where the rule state includes an array of event data corresponding to the set of node rules.

According to some aspects, the query engine retrieves the record from the database in response to the evaluation of the query rule. For example, in response to determining that the internal state of the query engine and the event include data that satisfies a query rule, a node rule included in the query rule, or a group of node rules included in the query rule that matches the query, the query engine retrieves a record that includes data that satisfies a query rule, a node rule included in the query rule, or a group of node rules included in the query rule.

At operation 625, the system updates the rule state. In some cases, the operations of this step refer to, or may be performed by, a state manager as described with reference to FIGS. 2 and 3.

According to some aspects, in response to evaluating the query rule, the query engine updates the internal state of the query engine to include the event, and data indicating that a node rule, a group of node rules, a query rule, or a combination thereof is satisfied. In some cases, the updated internal state of the query engine includes any future time dependence information for a group of node rules that indicates when the group of node rules will be satisfied in the future if no other events arrive. In some cases, the future time dependence information is a binary function of time.

In some cases, the query engine removes irrelevant data from the updated internal state of the query engine. For example, in some cases, irrelevant data is data that can no longer affect an evaluation of a query rule based on a time of the time stamp, thereby minimizing the amount of unnecessary data stored in the updated internal state.

In some cases, in response to updating the internal state of the query engine, the query engine provides the updated internal state to the state manager. According to some aspects, the state manager receives the updated internal state of the query engine and updates the rule state to include information included in the updated internal state of the query engine. For example, in some cases, the state manager updates the rule state to include current values (as included in the updated internal state of the query engine) for the unique serialization identifier for data represented in the rule state, the partial schema of event fields that are used to evaluate linking rules, the array of all events that match one or more node rules and that are part of a group of node rules that are not yet collectively satisfied, the unique identifier of any node rule or any group of node rules that is satisfied and will always be satisfied, the unique identifier of any node rule or any group of node rules that is satisfied but that also have time restrictions, the set of bits sets that indicate which events in the array of events apply to each node rule, future time dependence information for a group of node rules that indicates when the group of node rules will be satisfied in the future if no other events arrive, other information included in the updated internal state of the query engine, or a combination thereof.

According to some aspects, the state manager compresses and serializes the updated rule state to obtain a compressed rule state. For example, in a case where a set of a group of node rules are included in a set of query rules, and the set of the group of node rules includes a set of linking clauses, the updated rule state may include a portion of a set of events that match only some node rules of a group of node rules. When a group of node rules is satisfied, the state manager can remove events from the updated rule state if they do not satisfy another group of node rules.

According to some aspects, the state manager stores the updated rule state in a database (such as a database as describe with reference to FIG. 1). Accordingly, by updating the rule state to an updated rule state that includes a minimal amount of data, a record can be retrieved in response to a future query by determining if a query rule for the future query is satisfied by the updated rule state, rather than by comparing the query rule with all the data from each historical event that the system has received for the record. By storing the updated internal state of the query engine for a record as an updated rule state, the state manager allows the query engine to load different rule states corresponding to different users and different third-party users as internal evaluation states, thereby allowing the query engine to evaluate a set of different records.

At operation 630, the system provides customized content based on the retrieved record. In some cases, the operations of this step refer to, or may be performed by, a content component as described with reference to FIGS. 2 and 3.

For example, in some cases, the query engine provides the retrieved record to the content component. In some cases, the content component customizes content (such as an item of media including text, audio, an image, video, or a combination thereof, a communication, such as a text message, an email, an application notification, etc., or a physical object) by matching the content to the retrieved record. In some cases, the content is retrieved from a database, or from another storage source. In some cases, a physical object is customized by retrieving an association between the physical object and the retrieved record from a database, such as the database as described with reference to FIG. 1.

In some cases, when the record is retrieved, the content component provides the customized content to a user associated with the retrieved record. In some cases, the content component provides the customized content via the content channel corresponding to the event, or provides the customized content via a different content channel. For example, in cases where the content channel is a physical location, the content component directs the shipment of the physical object to the content channel. In cases where the content channel is a digital content channel, the content component provides the customized content via the digital content channel. In some cases, the content channel corresponding to the event is a digital content channel, and the different content channel is a physical location. In some cases, the content channel corresponding to the event is a physical location, and the different content channel is a digital content channel.

According to some aspects, in response to retrieving the record, the query engine provides the record to an external content providing system, or to a third-party user.

Figure 7:
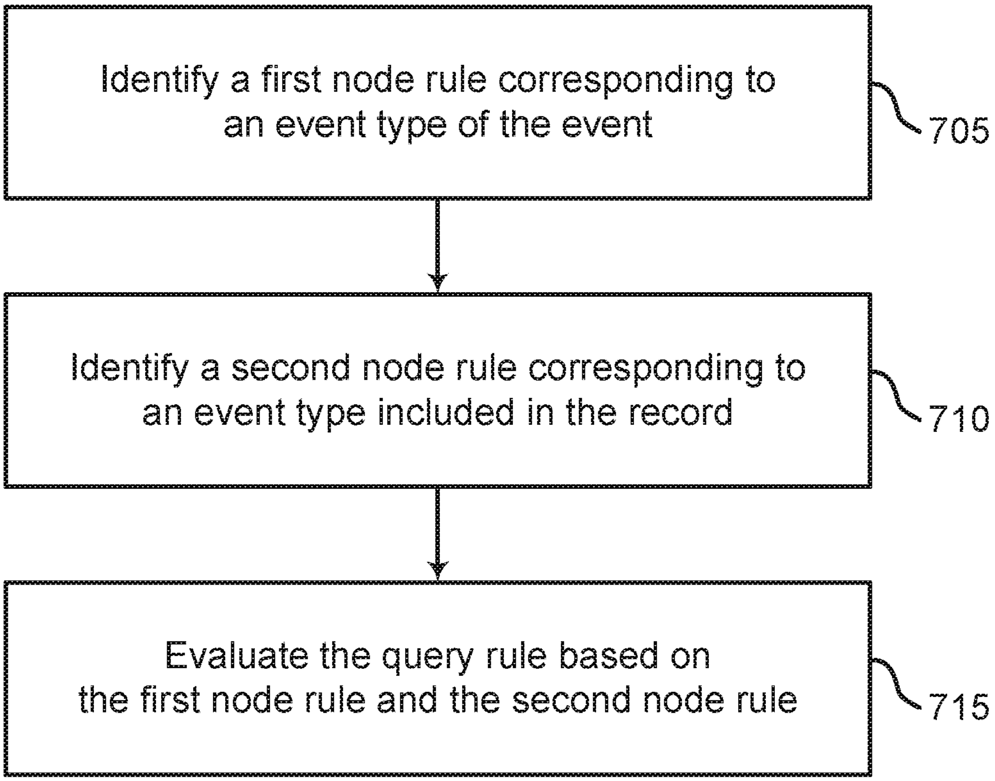
FIG. 7 shows an example of query rule evaluation according to aspects of the present disclosure.

FIG. 7 shows an example of query rule evaluation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, the system evaluates a query rule based on a first node rule and a second node rule.

At operation 705, the system identifies a first node rule corresponding to an event type of the event. In some cases, the operations of this step refer to, or may be performed by, a query engine as described with reference to FIG. 2. For example, in some cases, the query engine identifies the first node rule by identifying a query rule including the first node rule.

At operation 710, the system identifies a second node rule corresponding to an event type included in the record. In some cases, the operations of this step refer to, or may be performed by, a query engine as described with reference to FIGS. 2 and 3. For example, in some cases, the query engine identifies the second node rule by identifying a query rule including the second node rule.

At operation 715, the system evaluates the query rule based on the first node rule and the second node rule. In some cases, the operations of this step refer to, or may be performed by, a query engine as described with reference to FIGS. 2 and 3.

According to some aspects, an ordering of two node rules (such as the first node rule and the second node rule) within a query rule is interpreted by the query engine as meaning the first node rule is followed by the second node rule. For example, in some cases, for a query rule including a group of node rules including a node rule A and a node rule B to be satisfied, a last event that matches node rule A must occur prior to a first event that matches a second node rule B.

According to some aspects, the query engine identifies a linking rule that links the first node rule to the second node rule, and evaluates the group of node rules based on the linking rule. "WHERE(A.get(0).product==B.get(0).product)" included in (2) is an example of a linking rule. In this case, the linking rule is a lambda expression (e.g., a short block of code that takes in parameters and returns a value), and the linking rule means that a first event (e.g. a zero-indexed event) that satisfies node rule A must have a field called "product" having a value that is the same as a product field of a zero-indexed event that satisfies a predicate in node rule B, thereby ensuring that whatever product is purchased by the user must also have been viewed by the user. Accordingly, rather than representing a cycle of events corresponding to a linked group of node rules by an individual state machine, the query engine can save a corresponding event field of each event that satisfies a predicate portion of each node rule, and once the entirety of the linked group of node rules is satisfied, the corresponding event data can be discarded.

According to some aspects, an ordering of two node rules within a query rule is interpreted by the query engine as meaning a node rule followed by a node rule. For example, for a query rule including a node rule A and a node rule B to be satisfied, a last event that matches node rule A must occur prior to a first event that matches a second node rule B.

According to some aspects, the query engine identifies a linking rule that links the first node rule to the second node rule, and evaluates the query rule based on the linking rule. For example, "WHERE(A.get(0).product==B.get(0).product)" included in (2) is an example of a linking rule. In this case, the linking rule is a lambda expression (e.g., a short block of code that takes in parameters and returns a value), and the linking rule means that a first event (e.g. a zero-indexed event) that satisfies node rule A must have a field called "product" having a value that is the same as a product field of a zero-indexed event that satisfies a predicate in node rule B, thereby ensuring that whatever product is purchased by the user must also have been viewed by the user. Accordingly, rather than representing a cycle of events corresponding to a linked group of node rules by an individual state machine, the query engine can save a corresponding event field of each event that satisfies a predicate portion of each node rule, and once the entirety of the linked group of node rules is satisfied, the corresponding event data can be discarded.

According to some aspects, the query engine determines that the event is irrelevant data in response to evaluating the query rule(s). For example, the query engine determines that the event cannot affect the evaluation of the query rule(s) and is therefore irrelevant data. In some cases, the query engine provides the determination to the state manager, and the state manager removes the irrelevant data from the event database (such as the database as described with reference to FIG. 1).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for event processing, comprising:

receiving, by a state manager, an event corresponding to an interaction of a user with a digital content channel;

identifying, by the state manager, a rule state for a segmentation rule that assigns users to a segment, wherein the segmentation rule comprises a plurality of node rules and a node rule condition, wherein each of the plurality of node rules includes a field value and corresponds to a prior interaction of the user with the digital content channel and the node rule condition specifies a relationship among the field values of the plurality of node rules;

assigning, by an evaluation engine, the user to the segment by determining that each of the plurality of node rules in the segmentation rule is satisfied by evaluating the segmentation rule based on the rule state, the node rule condition, the field values of the plurality of node rules, and the event from the digital content channel; and providing, by a content component, customized content to the user based on the assignment of the user to the segment.

2. The method of claim 1, further comprising:

identifying, by the state manager, a plurality of segmentation rules for assigning users to a plurality of segments based on events from the digital content channel; and updating, by the state manager, a plurality of rule states corresponding to the plurality of segmentation rules, respectively, based on the event to obtain a plurality of updated rule states.

3. The method of claim 1, further comprising:

identifying, by the evaluation engine, a user profile of the user, wherein the user is assigned to the segment based on the user profile.

4. The method of claim 3, wherein:

the user profile includes dynamic event data that represents the interaction of the user and characteristic data that does not depend on the dynamic event data.

5. The method of claim 1, further comprising:

identifying, by the evaluation engine, a user profile for the user, wherein the segmentation rule is evaluated based on the user profile.

6. The method of claim 1, further comprising:

identifying, by the evaluation engine, an event type of the event; and evaluating, by the evaluation engine, the segmentation rule based on the event type.

7. The method of claim 1, further comprising:

receiving, by the state manager, a time stamp associated with the event; and removing, by the state manager, irrelevant data from the rule state based on the time stamp to obtain a clean rule state, wherein the rule state is updated based on the clean rule state.

8. The method of claim 1, further comprising:

compressing, by the state manager, the rule state to obtain a compressed rule state.

9. The method of claim 1, wherein:

the relationship indicates that a first field value of the plurality of field values is equal to a second field value of the plurality of field values.

10. An apparatus for event processing, comprising:

a processor;

a memory storing instructions executable by the processor;

a state manager configured to receive an event corresponding to an interaction of a user with a digital content channel and to identify a rule state for a segmentation rule that assigns users to a segment based on events from the digital content channel, wherein the segmentation rule comprises a plurality of node rules and a node rule condition, wherein each of the plurality of node rules includes a field value and corresponds to a prior interaction of the user with the digital content channel and the node rule condition specifies a relationship among the field values of the plurality of node rules;

an evaluation engine configured to assign the user to the segment by determining that each of the plurality of node rules in the segmentation rule is satisfied by evaluating the segmentation rule based on the rule state, the node rule condition, the field values of the plurality of node rules, and the event from the digital content channel; and a content component configured to provide customized content to the user based on the assignment of the user to the segment.

11. The apparatus of claim 10, wherein:

the state manager is further configured to identify a query rule state for a query rule for retrieving records in a database and to update the query rule state for the query rule; and the apparatus further comprises a query engine configured to receive a query corresponding to the query rule and to retrieve a record from the database by evaluating the query rule based on the query rule state in response to the query.

12. The method of claim 1, further comprising:

updating, by the state manager, the rule state.

13. A non-transitory computer readable medium storing code, the code comprising instructions that, when executed by at least one processor, cause the at least one processor to perform operations comprising:

receiving, by a state manager, an event corresponding to an interaction of a user with a digital content channel;

identifying, by the state manager, a rule state for a segmentation rule that assigns users to a segment, wherein the segmentation rule comprises a plurality of node rules and a node rule condition, wherein each of the plurality of node rules includes a field value and corresponds to a prior interaction of the user with the digital content channel and the node rule condition specifies a relationship among the field values of the plurality of node rules;

assigning, by an evaluation engine, the user to the segment by determining that each of the plurality of node rules in the segmentation rule is satisfied by evaluating the segmentation rule based on the rule state, the node rule condition, the field values of the plurality of node rules, and the event from the digital content channel; and providing, by a content component, customized content to the user based on the assignment of the user to the segment.

14. The non-transitory computer readable medium of claim 13, the code further comprising instructions that, when executed by the at least one processor, cause the at least one processor to perform operations comprising:

identifying, by the state manager, a plurality of segmentation rules for assigning users to a plurality of segments based on events from the digital content channel; and updating, by the state manager, a plurality of rule states corresponding to the plurality of segmentation rules, respectively, based on the event to obtain a plurality of updated rule states.

15. The non-transitory computer readable medium of claim 13, the code further comprising instructions that, when executed by the at least one processor, cause the at least one processor to perform operations comprising:

identifying, by the evaluation engine, a user profile of the user, wherein the user is assigned to the segment based on the user profile.

16. The non-transitory computer readable medium of claim 15, wherein:

the user profile includes dynamic event data that represents the interaction of the user and characteristic data that does not depend on the dynamic event data.

17. The non-transitory computer readable medium of claim 13, the code further comprising instructions that, when executed by the at least one processor, cause the at least one processor to perform operations comprising:

identifying, by the evaluation engine, a user profile for the user, wherein the segmentation rule is evaluated based on the user profile.

18. The non-transitory computer readable medium of claim 13, the code further comprising instructions that, when executed by the at least one processor, cause the at least one processor to perform operations comprising:

storing, by the state manager, the event in an event database;

evaluating, by the evaluation engine, the segmentation rule based on a plurality of events in the event database including the stored event; and assigning, by the evaluation engine, the user to the segment based on the evaluation of the segmentation rule based on the plurality of events.

19. The non-transitory computer readable medium of claim 13, the code further comprising instructions that, when executed by the at least one processor, cause the at least one processor to perform operations comprising:

identifying, by the evaluation engine, an event type of the event; and evaluating, by the evaluation engine, the segmentation rule based on the event type.

20. The non-transitory computer readable medium of claim 13, the code further comprising instructions that, when executed by the at least one processor, cause the at least one processor to perform operations comprising:

receiving, by the state manager, a time stamp associated with the event; and removing, by the state manager, irrelevant data from the rule state based on the time stamp to obtain a clean rule state, wherein the rule state is updated based on the clean rule state.

* * * * *